(No Model.)

G. H. CRESSE.
HORSE DETACHER.

No. 282,960. Patented Aug. 14, 1883.

WITNESSES:
H. B. Brown
W. P. Robertson

INVENTOR
George H. Cresse
BY T. J. W. Robertson
ATTORNEY.

UNITED STATES PATENT OFFICE.

GEORGE H. CRESSE, OF CAPE MAY, NEW JERSEY.

HORSE-DETACHER.

SPECIFICATION forming part of Letters Patent No. 282,960, dated August 14, 1883.

Application filed March 21, 1883. (No model.)

*To all whom it may concern:*

Be it known that I, GEORGE H. CRESSE, a citizen of the United States of America, residing at Cape May, in the county of Cape May and State of New Jersey, have invented certain new and useful Improvements in Tripping Devices, of which the following is a specification, reference being had therein to the accompanying drawings.

This invention relates to an improvement in tripping devices designed more particularly for use as a horse-detaching apparatus, but may be applied to many other uses; and the invention consists in the peculiar construction and arrangement of parts hereinafter more fully described, and then pointed out in the claims.

Figure 1:
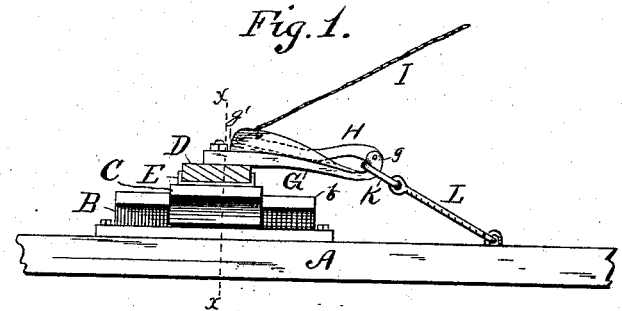
Figure 2:
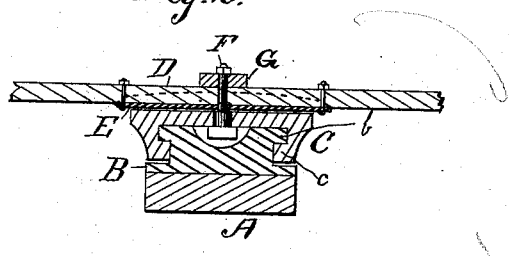
Figure 3:
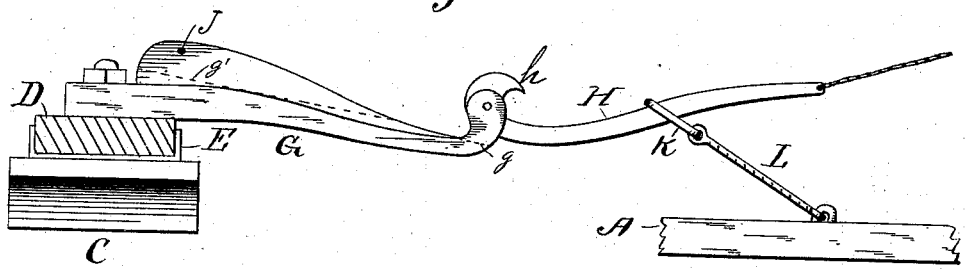

In the accompanying drawings, Figure 1 represents a side elevation of my detacher as applied to a vehicle or harvester-machine tongue, with the trip closed. Fig. 2 is a vertical cross-section through $x$ $x$ of Fig. 1, and Fig. 3 represents a side elevation on a larger scale with the trip open.

In the form shown in the drawings, A represents the tongue of a vehicle, or a mowing or harvesting machine of any kind, provided with a block, B, firmly bolted thereto.

C is a slide loosely fitted to the top of the block B, and provided with lugs $c$, catching under flanges or ribs $b$ on the block B.

At D is shown the single-tree, preferably provided at its under side with the plate E, bolted or secured thereto in any convenient manner. Through this single-tree plate and slide is passed the bolt F, on which the double-tree turns, which bolt also secures to the top of the single-tree the hook G of the tripping device; but the hook may be attached to or form part of the plate E, if preferred.

At H is shown a trip having one end formed into a hook, $h$, (see Fig. 3,) and the other end provided with a small hole, into which is secured a cord, wire, chain, or any suitable pulling device, as shown at I. The trip is preferably pivoted in a groove, $g$, in the hooked end of the stock, and its long arm, when in its normal position, lies in another groove, $g'$, in the other end of the stock.

At J is shown a small wire or wooden pin, which serves to keep the trip in its normal position and thus prevent its accidental displacement.

At K is represented a ring, which may be part of a chain or cable; or it may be connected with the pole or tongue or the cross-bar of the shafts of a vehicle or a mowing or similar machine by the link L; or the end of the link L may be made with a loop large enough to receive the tripping device.

The operation of the device is as follows: If, for any reason—such as a runaway, for instance—it should be desirable to disengage the horses, it will be only necessary to give the cord I a sharp pull, sufficient to break the wire or pin, when the trip assumes the position shown in Fig. 3, and the single-tree and slide will immediately slide off the block B, leaving the horses loose, and entirely disconnecting them from the vehicle or machine, by which means hundreds of lives may be saved that are now lost by reason of accidents caused by runaway horses, &c.

It is obvious that my tripping device may be applied to many other uses—for instance, it may be used between an anchor and a cable, whereby the anchor can be tripped to save the vessel in case of a threatened collision or danger from being cut through with ice when at anchor.

It is obvious that instead of the pin or wire J a string, small enough to easily break, may be passed through the hole and tied therein, or that the trip H may be held in place by a simple friction device—such, for example, as a spring located in the side of the groove and adapted to bear against the side of the trip.

Any novel feature shown or described herein, but not claimed, I reserve the right to cover by a subsequent application.

What I claim as new is—

1. A tripping device consisting of the hook G and trip H, the latter pivoted to the extremity of the hook G, and having one end formed into a hook, $h$, and the other provided with the cord I, substantially as described.

2. The combination, with the hook G, provided with grooves $g$ $g'$, of the trip H, having its hooked end pivoted in the groove $g$ and its other end constructed to lie in the groove $g'$, substantially as described.

3. The combination, with the hook G and trip

H, having one end pivoted to said hook G, of the holding-pin J, substantially as described.

4. In a horse-detacher, the combination, with the tongue A, of the block B, slide C, single-tree D, pivoted to said slide, and a suitable fastening device to hold the slide on the block, substantially as described.

5. In a horse-detacher, the combination, with the tongue A, of the block B, slide C, single-tree D, pivoted to said slide, and the tripping device G H, substantially as described.

In testimony whereof I affix my signature, in presence of two witnesses, this 6th day of March, 1983.

GEORGE H. CRESSE.

Witnesses:
H. F. DOUGLASS,
JOHN BENNETT.